UNITED STATES PATENT OFFICE.

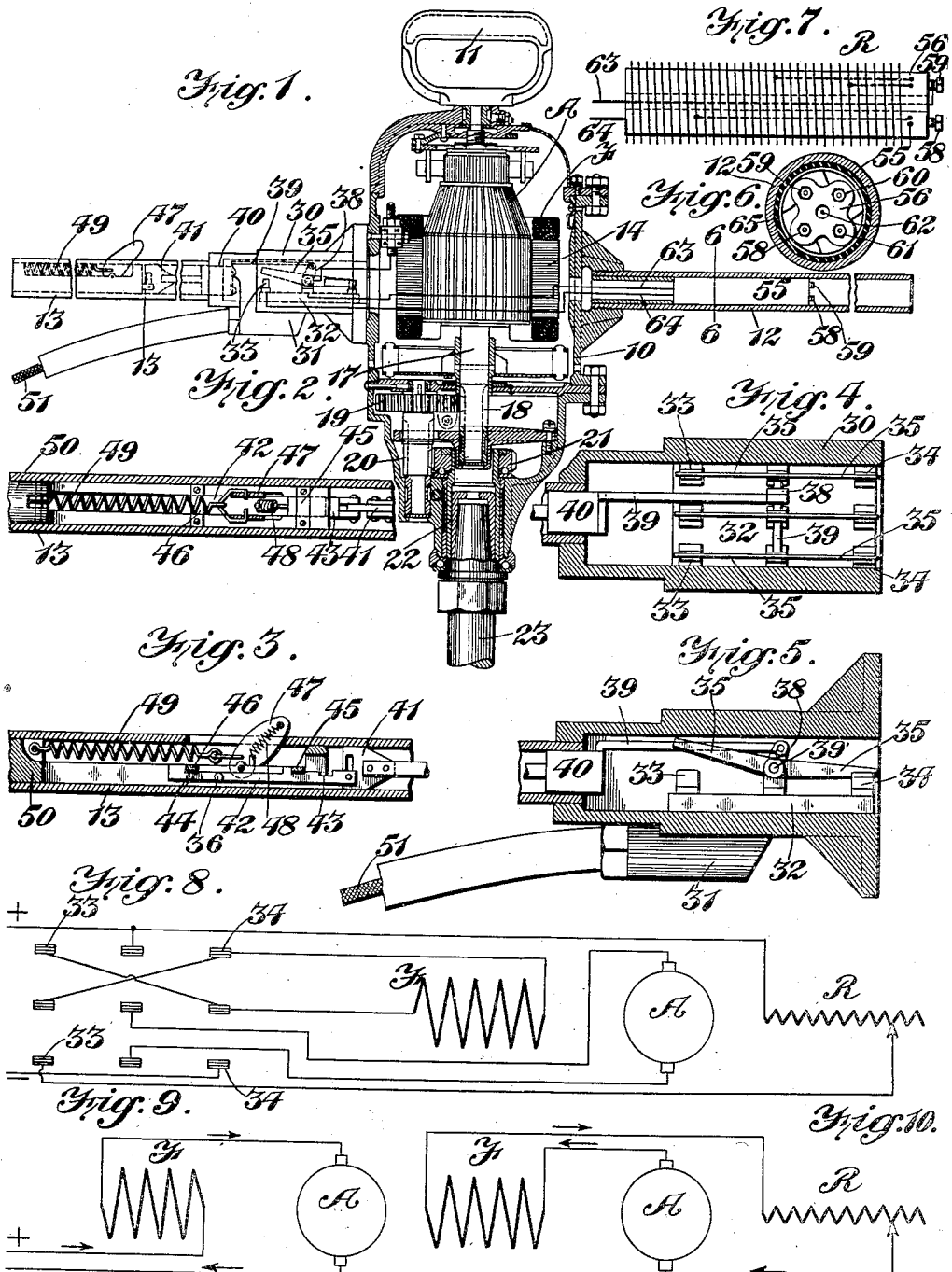

JOSEPH A. OSBORN, OF ST. LOUIS, MISSOURI.

PORTABLE ELECTRICALLY-DRIVEN TOOL.

1,117,140.

Specification of Letters Patent. Patented Nov. 10, 1914.

Application filed December 12, 1913. Serial No. 806,181.

*To all whom it may concern:*

Be it known that I, JOSEPH A. OSBORN, a citizen of the United States, and residing at St. Louis, in the State of Missouri, have invented certain new and useful Improvements in Portable Electrically-Driven Tools, of which the following is a specification.

This invention relates to portable electrically operated tools, such as, drills and reamers. Such a tool is provided with an electric motor comprising a stator and a rotor, and the rotor drives a tool element, such as, a drill or reamer. As the electric motor necessarily operates at a high speed, gearing is provided to reduce the speed of the tool element to the desired point. The counter-shaft of the reduction gearing is, of course, mounted eccentrically with respect to the tool element, and this gives the armature a considerable leverage tending to rotate the stator. The stator is provided with a handle or grip to permit the operator to guide the same, and in case of tools of large capacity is usually provided with one or more torsion arms, projecting radially with respect to the stator, to permit the operator to hold the stator against rotary movement, due to the reaction caused by the tool element holding rotor. It sometimes happens that the tool element will bind or stick in the work operated upon; when this happens the stator will tend to revolve in a direction opposite to the direction of rotation of the rotor, the counter-shaft and its connected gears rotating and rolling around the tool and acting as planetary gears, and causing the armature to act at a considerable leverage. Since the leverage is great, and since the rotor was at that time revolving at a high speed, the stator will be started with a jerk. This sudden starting of the stator is not only liable to throw the operator off of his feet, but is also liable to seriously injure him.

It has been proposed to overcome this objection by providing a switch, which will be opened by the operator when the stator starts to revolve upon binding of the tool element, so as to break the motor circuit, that is disconnect the motor from its source of current. In large capacity or heavy duty tools, however, (weighing as much as ninety pounds, and having a four horse power motor, developing the torque of an eight horse power motor at starting) the rotor has considerable inertia, and this rotor rotating at a high speed accumulates considerable momentum, so that, even after the current is cut off, this rotor, operating under its momentum and at a considerable leverage on the stator, tends to revolve the stator with considerable force when the tool element sticks. Moreover the heavy stator, and especially the radially projecting arms, possess considerable inertia, whereby this stator and its arms, when started by the binding of the tool, will accumulate considerable momentum, and will therefore continue to revolve under momentum. The result, therefore, is that, upon sticking of the tool element, and after the current is cut off, the stator will be started and continue to revolve with considerable force due to the accumulated momentum, and the stator and its arms are liable to cause considerable injury to the operator before the energy due to inertia is dissipated.

The objects of this invention therefore are to provide means for braking the stator with respect to its rotor, so as to dissipate the energy and bring the stator to rest, and more particularly to provide electrical braking means set in operation by the operator upon binding of the tool element, for causing the braking means to be applied, so as to arrest the stator with respect to the rotor immediately after the tool starts to bind.

Further objects will appear from the detail description taken in connection with the accompanying drawing in which:

Figure 1 is a vertical section through a tool embodying this invention, one of the torsion arms being shown in elevation, Fig. 2 is a horizontal section, taken along a part of one of the torsion arms, Fig. 3 is a vertical section, Fig. 4 is an enlarged horizontal section, taken along another part of the arm, showing the switch, Fig. 5 is a vertical section, Fig. 6 is a section on the line 6—6 Fig. 1, Fig. 7 is a detail showing the resistance element, Fig. 8 is a diagram, showing the connections of the motor and the braking resistance with the switch, Fig. 9 is a diagram, showing the connections of the motor when running, and Fig. 10 is a diagram, showing the connections of the motor when braking.

Referring to the accompanying drawing, 10 designates a stator casing carrying radially projecting arms 12 and 13. This stator also carries the field poles 14 provided with a magnetizing winding F of the usual multipole type. The rotor or armature is mounted in the stator and is provided with a winding A. The rotor shaft 17 is provided with gear teeth 18 meshing with a gear 19 on a counter shaft, which is in turn provided with gear teeth 20 meshing with a gear 21 on a spindle 22, carrying the tool element 23.

The arm 13 has an enlarged portion 30 forming a receptacle closed by a cap 31. This receptacle receives a switch, which is of the three pole, double throw type, and comprises a base 32 provided with contacts 33 and 34, and a movable switch element having blades 35 mounted on a shaft 39'. This shaft 39' has an arm 38 connected by a pin and slot connection with a link 39 on a plunger 40 guided in the arm 13. The plunger 40 has attached thereto a cross head 41, which has a pin and slot connection with a sliding bar 42, having a limited pivotal movement on trunnions 36 bearing on the inside face of the arm. This bar has recessed shoulders 43—44 coöperating with cross bars 45—46 in the arm. A hand piece 47 is pivoted in the arm, and is connected by a spring 48 to the bar. A spring 49 connects this handle with an end plug 50 in the arm. When the hand piece 47 is in the position shown in the drawing, the switch element will be in a position to hold the blades 35 in engagement with the contacts 34. If now the hand piece is released, the spring 49 will swing this hand piece so as to move the spring 48 over the center of the hand piece, and, first, place the bar 42 under the tension so as to tend to move it to the left, and then tip the left hand end of the bar downwardly so as to move the shouldered recess 44 out of engagement with the cross bar 46, and cause the entire bar to be moved to the left under the tension of the spring 49. This will disengage the blades 35 from the contacts 34 and throw them into engagement with the contacts 33. It will be noted that the bar 42 is under the tension of the spring 48 before the shouldered recess 44 is disengaged from the bar 46; therefore after this bar is tipped it will move to the left with a snap, thereby quickly shifting the movable switch element. Similarly the switch can be moved to its first position by moving the hand piece back against the tension of its spring 48. The line connections to the switch are shown at 51. The above described switch actuating mechanism is well known and forms no part of this invention.

The arm 12 has mounted therein a resistance element 55, comprising a core 56 of insulating material, having a resistance winding R, and provided with binding posts 58, 59, 60 and 61, connected to different parts of the winding as shown in Fig. 7. The core is also provided with an aperture 62 to receive a lead 63. The lead 63 and the end lead 64 of the winding are connected to the switch, the connections being shown in Fig. 8, which also shows the connections of the armature and field windings to this switch. The lead 63 can be connected to any of the binding posts to cut in different parts of the winding R. The resistance element is inclosed by a sleeve 65 of insulating material, and the entire element is rendered accessible by unscrewing the arm 12 from the stator.

When the switch is in position as shown in the drawing, so as to connect the blades 35 with the contacts 34, the field and armature will be connected in series with the line to cause the motor to operate as a series motor, as shown in Fig. 9. If the switch is now thrown to reverse position, so as to connect the switch blades 35 with the contacts 33, the motor will, first, be disconnected from the line, and the armature and field will then be connected in series with the resistance R, the field terminals being, however, in this case reversed with respect to the armature, as shown in Fig. 10.

In Fig. 10, the motor is shown connected for dynamic braking, at which time the motor acts as a generator. To do this it is necessary to connect the series field F in series with the armature, but in reversed relation, in order that the polarity of the field may remain unchanged, as the direction of current is reversed by changing the machine from motor to generator. A resistance must also be cut in to provide a suitable load and limit the value of the current. It will be noted that the spring 49 will normally throw the switch to the position in which the connections will be made as shown in Fig. 10, and that the running connections are made while the hand piece 47 is held in the position shown in Figs. 1 and 3, against the tension of the spring 49. When however, this hand piece is released it will be automatically returned by the spring 49.

To start the motor the operator will move the hand piece 47 to the position shown in Figs. 1 and 3, and hold it in that position while the hand grips the arm 13. This will throw the switch to running position, in which the motor is connected to the line to operate as a series motor, as shown in Fig. 9. If now the tool should bind, the stator will start to revolve with a jerk, and as it starts the operator is compelled to release his grip on the handle, which will cause the spring 49 to return the hand piece 47, so as to throw the switch to its other position. This movement of the switch will first disconnect the motor from the line, and will then connect the motor armature A in series with the resistance R and the field winding F, with the field winding in reversed relation. The revolving of the rotor and stator, relatively under momentum will now cause the motor to act as a series generator, and the current so generated will cause the movement of the stator to be braked dynamically with respect to the rotor, causing the two to become, in effect, interlocked, so as to arrest the movement of the stator. The braking effect will vary with the speed and with the resistance of the dynamic braking circuit. By proper adjustment of the resistance R, the braking effect can be made great enough to arrest the stator immediately upon binding of the tool. As the relative movement between the rotor and stator decreases, the current will decrease with the speed to zero. It will therefore be seen that the invention accomplishes its objects. As soon as the tool element starts to bind, the operator will automatically throw the switch to disconnect the motor from the line, and the braking means will then be applied to automatically bring the stator to a stop. This braking means consists in this case of the motor together with its controlling means. The additional parts added to the tool are very simple and of light weight. This point is important in portable tools, where the weight must be kept down to a minimum. The use of the motor itself as a brake requires the addition of only a switch and a resistance, neither of which effects the construction of the tool as a whole, and does not complicate either its construction or operation.

While I have described and shown one form of braking means which may be used with an electrically operated portable tool, it is obvious that other braking means may be used. Thus the brake may be a mechanical friction brake, which is set by a spring and released by a solenoid in the motor circuit, so that when the motor is connected to the line, the solenoid will receive current at the same time to release the brake, so as to allow the rotor to start. As soon, however, as the motor is disconnected from the line by the operator releasing his hold on the hand piece, the solenoid will be cut out with the motor, permitting the spring to apply the brake and stop the motor. It is also obvious that various other arrangements may be used whereby a current may be passed through the motor circuit in such a manner as to cause a resistance to rotation and brake the stator with respect to the rotor, so as to arrest the movement of the former. It is further obvious that various changes may be made in details of construction without departing from the spirit of this invention, and it is therefore to be understood that this invention is not to be limited to the specific construction and operation described.

Having thus described the invention what is claimed is:

1. A portable electrically operated tool having an electric driving motor constructed to acquire considerable momentum and including a tool element driving rotor and a manually held stator, and means for braking said stator with respect to said rotor, adapted to prevent rotation of the stator upon binding of the tool element.

2. A portable electrically operated tool having an electric driving motor including a tool element driving rotor and a stator, and means operating upon binding of the tool element for braking said stator with respect to said rotor.

3. A portable electrically operated tool having an electric driving motor constructed to acquire considerable momentum and including a tool element driving rotor and a manually held stator, and means for disconnecting the motor from the source of current and for then braking said stator with respect to said rotor, adapted to prevent rotation of the stator upon binding of the tool element.

4. A portable electrically operated tool having an electric driving motor constructed to acquire considerable momentum and including a tool element driving rotor and a manually held stator, and means for disconnecting the motor from the source of current and for then causing current to traverse the motor to brake said stator with respect to said rotor, adapted to prevent rotation of the stator upon binding of the tool element.

5. A portable electrically operated tool having an electric driving motor constructed to acquire considerable momentum and including a tool element driving rotor and a manually held stator, and means for disconnecting the motor from the source of current and for then connecting the motor to dynamically brake said stator with respect to said rotor, adapted to prevent rotation of the stator upon binding of the tool element.

6. A portable electrically operated tool having an electric driving motor including a tool element driving rotor and a stator, and means operated upon binding of the tool element for causing a current to traverse the motor to brake said stator with respect to said rotor.

7. A portable electrically operated tool having an electric driving motor including a tool element driving rotor and a stator, and means operated upon binding of the tool element for disconnecting the motor from the source of current and for then braking said stator with respect to said rotor.

8. A portable electrically operated tool having an electric driving motor including a tool element driving rotor and a stator, and means operated upon binding of the tool element for disconnecting the motor from the source of current and for then connecting the motor to dynamically brake said stator with respect to said rotor.

9. A portable electrically operated tool having an electric driving motor including a tool element driving rotor and a stator, means for braking said stator with respect to said rotor, and means set in operation by the operator upon binding of the tool element for setting said braking means.

10. A portable electrically operated tool having an electric driving motor including a tool element driving rotor and a stator, means for braking said stator with respect to said rotor, and means set in operation by the operator upon binding of the tool element for disconnecting the motor from the source of current and for then setting said braking means.

11. A portable electrically operated tool having an electric driving motor including a tool element driving rotor and a stator, and means set in operation by the operator upon binding of the tool element for causing a current to traverse the motor to brake said stator with respect to said rotor.

12. A portable electrically operated tool having an electric driving motor including a tool element driving rotor and a stator, and means set in operation by the operator upon binding of the tool element for disconnecting the motor from the source of current and for then connecting the motor to dynamically brake said stator with respect to said rotor.

13. A portable electrically operated tool having an electric driving motor including a tool element driving rotor and a stator, and having a torsion arm for holding the stator, means for braking said stator with respect to said rotor, and a controlling member for said braking means mounted on said arm.

14. A portable electrically operated tool having an electric driving motor including a tool element driving rotor and a stator, and having a torsion arm for holding the stator, means for braking said stator with respect to said rotor and means on said arm set in operation by the operator upon binding of the tool element for setting said braking means.

15. A portable electrically operated tool having an electric driving motor including a tool element driving rotor and a stator, and having a torsion arm for holding the stator, and a resistance for the motor circuit, positioned in said arm.

16. A portable electrically operated tool having an electric driving motor constructed to acquire considerable momentum and including a rotor and a manually held stator, a rotatable tool element, gearing mounted on said stator and connecting said rotor and said tool element, and means for braking said stator with respect to said rotor, adapted to prevent rotation of the stator upon binding of the tool element.

17. A portable electrically operated tool having an electric driving motor constructed to acquire considerable momentum and including a rotor and a manually held stator, a rotatable tool element mounted in said stator separately from but driven by said rotor, and means for braking said stator with respect to said rotor, adapted to prevent rotation of the stator upon binding of the tool element.

18. A portable electrically operated tool having an electric driving motor constructed to acquire considerable momentum and including a rotor and a manually held stator, a rotatable tool element, gearing mounted on said stator and connecting said rotor and said tool element, one element of said gearing being eccentric with respect to said rotor, and means for braking said stator with respect to said rotor, adapted to prevent rotation of the stator upon binding of the tool element.

19. A portable electrically operated tool having an electric driving motor including a rotor and a stator, and having a torsion arm for holding the stator, a rotatable tool element, gearing connecting said rotor and said tool element, means for braking said stator with respect to said rotor, and a controlling member for said braking means mounted on said arm.

20. A portable electrically operated tool having an electric driving motor including a rotor and a stator, and having a torsion arm for holding the stator, a rotatable tool element, gearing connecting said rotor and said tool element, means for braking said stator with respect to said rotor, and means on said arm set in operation by the operator upon binding of the tool element for setting said braking means.

In testimony whereof I have hereunto affixed my signature in the presence of these two witnesses.

JOSEPH A. OSBORN.

Witnesses:
 GERTRUDE A. HEYMANN,
 J. H. BRUNINGA.